United States Patent [19]

Smith

[11] 4,001,045

[45] Jan. 4, 1977

[54] THERMOCOUPLE

[75] Inventor: George Watson Smith, London, England

[73] Assignee: Sangamo Weston Limited, Enfield, England

[22] Filed: Mar. 3, 1975

[21] Appl. No.: 554,457

[52] U.S. Cl. .............................. 136/230; 136/231
[51] Int. Cl.² .......................................... F16K 16/20
[58] Field of Search ........................... 136/230, 231

[56] References Cited

UNITED STATES PATENTS

| 1,633,599 | 6/1927 | Moeller | 136/230 |
| 3,159,032 | 12/1964 | Rademacher et al. | 136/231 |
| 3,911,747 | 10/1975 | Sivyer | 136/230 |

FOREIGN PATENTS OR APPLICATIONS 584,088   9/1959   United Kingdom ............... 136/231

Primary Examiner—Brooks H. Hunt
Attorney, Agent, or Firm—Young & Thompson

[57] ABSTRACT

A thermocouple having a relatively long thermocouple element portion extending co-axially within an encircling sheath has said portion supported by means which, while not normally movable relative to the element, are in sliding contact with the sheath. The support is preferably one or more thin-walled ferrules secured, for example by brazing, to the thermocouple element.

6 Claims, 1 Drawing Figure

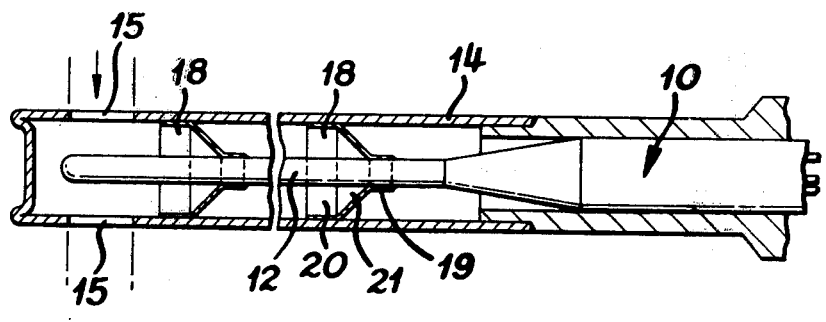

THERMOCOUPLE

FIELD OF THE INVENTION

This invention relates to thermocouples. It is particularly concerned with a mechanical support system for a long thermocouple element.

DESCRIPTION OF THE PRIOR ART

In certain situations there is a requirement for a long reach thermocouple with a fast response which will withstand high temperatures and high levels of vibration. Thus, when designing an appropriate support for the thermocouple element one has to bear in mind both the length of the thermocouple element and also the vibration and temperature conditions under which it will be used. It is conventional practice to mount a thermocouple element within an outer sheath to provide strength and support. It is of course then necessary to provide some support between the thermocouple element and the surrounding sheath. However, with such an arrangement one has to consider the problems of differential thermal expansion between the sheath and the thermocouple element, vibration damping, co-axial alignment of the thermocouple element within the sheath, and fast response of the thermocouple element.

SUMMARY OF THE INVENTION

It is an object of the present invention to provide a thermocouple element with a mechanical support system which provides a favourable solution to each of these points of consideration.

In accordance with the present invention there is provided a thermocouple comprising a temperature-responsive thermocouple element having a first relatively large diameter portion and a second relatively small diameter portion, a rigid sheath co-axially surrounding the thermocouple element, and support means mounted on said second portion of the thermocouple element, said support means in use being incapable of sliding movement relative to the thermocouple element and having at least one surface in contact with the internal wall of said sheath permitting the thermocouple element to slide within the sheath.

Preferably two part-frusto-conical thin wall support ferrules are used at spaced positions along the thermocouple element to provide support surfaces in sliding contact with the internal wall of the sheath. These support ferrules may be brazed to the thermocouple element.

BRIEF DESCRIPTION OF THE DRAWING

The accompanying drawing shows a longitudinal sectional view through one embodiment of thermocouple in accordance with the present invention.

DESCRIPTION OF THE PREFERRED EMBODIMENT

As shown in the drawing, the thermocouple comprises a mineral-insulated thermocouple element 10 which has a relatively small diameter swaged end portion 12 of for example 2 mm. diameter. Around the body of the thermocouple element 10 is an outer cylindrical sheath 14 which is rigid and may be for example a stainless steel sheath of 9.53 mm. outside diameter. The outer sheath 14 extends co-axially over the swaged end portion 12 of the thermocouple element and is provided adjacent to its outer end with ports 15 for the passage of gas over the tip of the thermocouple element.

It will be appreciated that there is a considerable space between the outer sheath 14 and the small diameter swaged end portion of the thermocouple element. Two part-frusto-conical thin-walled support ferrules 18 are provided within this space at spaced positions along the length of the small diameter end portion 12 of the thermocouple element. Each support ferrule 18 has a first relatively small diameter cylindrical portion 19 which is fixedly secured to the thermocouple element, a relatively large diameter cylindrical portion 20 which has its outer peripheral surface in contact with the internal surface of the outer sheath 14, and a tapering frusto-conical intermediate portion 21 between the cylindrical portions 19 and 20 and integral therewith. The ferrules 18 are sized so that although the cylindrical portions 20 contact the outer sheath 14 they are free to slide within the outer sheath. The ferrules 18 fully support the small diameter swaged end portion 12 of the thermocouple element and meet the design requirements referred to above. If nickel brazing is used for securing the cylindrical portions 19 of the ferrules 18 to the thermocouple element 12 it will be appreciated that there is only a very small amount of brazing necessary around the very thin sheath of the thermocouple element 12, and this overcomes the danger of "braze erosion" of the thermocouple element which may be caused by excessive use of active braze compounds.

With the design of thermocouple support system as described above one can achieve fast response of the thermocouple element in conjunction with low mass of the support ferrules and a facility for shaping the response curve by the positioning of the support ferrules along the length of the thermocouple element.

Although the embodiment described above uses two ferrules to provide the necessary support, alternative support means can be used which will permit sliding of the thermocouple element and support within the outer sheath. For example, one or a greater number of ferrules may be used; one or more spider elements extending radially outwardly could be used; or two diametral arms set at right-angles with a hole through the centre for support of the thermocouple element could be used. It is not necessary that the supports be permanently attached to the thermocouple element 12, such as by brazing. The mounting of the support or supports on the element 12, although preferably permanent, could be arranged to be detachable, although the mounting would have to be such that in use the supports are incapable of sliding relative to the thermocouple element which pass therethrough.

I claim:

1. A thermocouple comprising a temperature-responsive thermocouple element having a first relatively large diameter portion and an elongated second relatively small diameter portion, a rigid sheath co-axially surrounding the thermocouple element, and support means mounted on said second portion of the thermocouple element, said support means in use being incapable of movement relative to the thermocouple element lengthwise of said second portion and having at least one surface in sliding contact with the internal wall of said sheath permitting the thermocouple element to slide within the sheath.

2. A thermocouple as claimed in claim 1, in which said support means is fixedly secured to the thermocouple element.

3. A thermocouple as claimed in claim 2, in which the support means is brazed to the thermocouple element.

4. A thermocouple as claimed in claim 1, in which the support means comprises at least one thin wall ferrule having a first cylindrical portion in contact with the thermocouple element, a second cylindrical portion in sliding contact with the internal sheath wall, and a tapering portion extending between said cylindrical portions.

5. A thermocouple as claimed in claim 4, which has two of said ferrules spaced along the length of said second portion.

6. A thermocouple as claimed in claim 1, in which the support means comprises at least one spider element around the thermocouple element and extending radially outwardly to the internal sheath wall.

* * * * *